(12) United States Patent
Nishimori

(10) Patent No.: US 10,326,281 B2
(45) Date of Patent: Jun. 18, 2019

(54) POWER CONDITIONER, PHOTOVOLTAIC POWER GENERATION DEVICE, AND CONTROL METHOD

(71) Applicant: KYOCERA Corporation, Kyoto (JP)

(72) Inventor: Masanori Nishimori, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 953 days.

(21) Appl. No.: 14/773,728

(22) PCT Filed: Mar. 7, 2014

(86) PCT No.: PCT/JP2014/001292
§ 371 (c)(1),
(2) Date: Sep. 8, 2015

(87) PCT Pub. No.: WO2014/136459
PCT Pub. Date: Sep. 12, 2014

(65) Prior Publication Data
US 2016/0043557 A1    Feb. 11, 2016

(30) Foreign Application Priority Data

Mar. 7, 2013   (JP) ................................ 2013-045345

(51) Int. Cl.
*H02J 3/38* (2006.01)
*G05F 1/67* (2006.01)
*H02M 3/04* (2006.01)
*H02M 7/44* (2006.01)

(52) U.S. Cl.
CPC ............... *H02J 3/385* (2013.01); *G05F 1/67* (2013.01); *H02M 3/04* (2013.01); *H02M 7/44* (2013.01); *Y02E 10/58* (2013.01)

(58) Field of Classification Search
CPC ................................ H02J 3/385; Y02E 10/58
See application file for complete search history.

(56) References Cited

U.S. PATENT DOCUMENTS

2013/0257155 A1*  10/2013  Judkins ................... H02S 50/00
                                                                     307/43

FOREIGN PATENT DOCUMENTS

| EP | 1 635 438 A2 | 3/2006 |
|---|---|---|
| JP | 7-334260 A | 12/1995 |
| JP | 2003-134667 A | 5/2003 |

(Continued)

OTHER PUBLICATIONS

Office Action dated Jul. 19, 2016, issued in counterpart Japanese application No. 2015-504186.

(Continued)

*Primary Examiner* — Thanh Luu
(74) *Attorney, Agent, or Firm* — Procopio Cory Hargreaves and Savitch LLP

(57) ABSTRACT

A power conditioner (12) includes a detector (15) and a controller (19). The detector (15) detects electrical output of each of a plurality of photovoltaic cell modules (11). The controller (19) compares a change over time in the electrical output detected by the detector (15) with a threshold. When the change over time exceeds the threshold for a plurality of photovoltaic cell modules (11) and the photovoltaic cell modules (11) are in a predetermined positional relationship, the controller (19) causes the photovoltaic cell modules (11) to perform a maximum power point search.

13 Claims, 7 Drawing Sheets

(56) References Cited

FOREIGN PATENT DOCUMENTS

| JP | 2012-186409 A | 9/2012 |
|---|---|---|
| WO | 2006/033142 A1 | 3/2006 |
| WO | 2014/136459 A1 | 9/2014 |

OTHER PUBLICATIONS

Extended European Search Report dated Sep. 12, 2016 issued by the European Patent Office for counterpart European Patent Application No. 14 761 035.6.
International Search Report dated Jun. 17, 2014 issued in counterpart International Application No. PCT/JP2014/001292.
Written Opinion of the International Searching Authority issued by Japan Patent Office for International Application No. PCT/JP2014/001292.

\* cited by examiner

POWER CONDITIONER, PHOTOVOLTAIC POWER GENERATION DEVICE, AND CONTROL METHOD

CROSS-REFERENCE TO RELATED APPLICATION

This application claims the benefit of PCT Application No. PCT/JP2014/001292 filed on Mar. 7, 2014, which claims the benefit of Japanese Patent Application No. 2013-45345 filed Mar. 7, 2013. The contents of each of the above applications are incorporated by reference herein in their entirety.

TECHNICAL FIELD

This disclosure relates to a power conditioner, photovoltaic power generation device, and control method that cause photovoltaic cell modules to perform a maximum power point search.

BACKGROUND

Photovoltaic power generation is a known way of generating power by converting sunlight into power. In photovoltaic cell modules used in photovoltaic power generation, the generated power has a peak with respect to the current or voltage (see FIG. 7(a)). In order to increase power generation efficiency, there is a demand for power to be generated at the current or voltage at which the generated power peaks.

The peak of generated power varies according to a variety of factors such as sunlight conditions, temperature, and the like. Therefore, in order to improve the power generation efficiency, control for maximum power point tracking is performed by generating power while tracking the maximum power point, i.e. the current or voltage that maximizes the generated power.

Normally, a hill climbing method is used as control for maximum power point tracking. When the peak position of the current or voltage that causes the generated power to peak simply varies, the hill climbing method can be used to cause the photovoltaic cell module to generate power at the maximum power point.

In an abnormal state in which a shadow is cast on a portion of the photovoltaic cell module, however, there may be multiple peaks in the generated power (see FIG. 7(b)). When there are multiple peaks, it might not be possible to generate power at the actual maximum power point with the hill climbing method.

It is possible to distinguish the maximum among a plurality of peaks in the generated power with a maximum power point search, in which the maximum power point is searched for by measuring the actual generated power while varying the current or voltage over the entire adjustable range thereof. During a maximum power point search, however, power is generated even in a state when the generated power is small. Therefore, the power generation efficiency may be reduced due to the performance of an unnecessary maximum power point search.

An unnecessary maximum power point search can be prevented by performing the maximum power point search in an abnormal state. It has thus been proposed to distinguish an abnormal state of a photovoltaic cell periodically (see JP 2012-186409 A (PTL 1)).

CITATION LIST

Patent Literature

PTL 1: JP 2012-186409 A

SUMMARY

Technical Problem

In the photovoltaic cell abnormality discernment device of PTL 1, however, it is necessary periodically to suspend power generation of the photovoltaic cell and to measure short-circuit current, open-circuit voltage, and the like. Accordingly, power generation is suspended even when an abnormality has not occurred. Hence, the power generation efficiency may be reduced due to unnecessary suspension of power generation.

It could therefore be helpful to provide a power conditioner, a photovoltaic power generation device, and a control method that cause a maximum power point search to be performed in a way that suppresses a reduction in power generation efficiency.

Solution to Problem

In order to resolve the above problems, a power conditioner according to a first aspect includes:
a detector configured to detect electrical output of each of a plurality of photovoltaic cell modules; and
a controller configured to compare a change over time in the electrical output detected by the detector with a threshold, and when the change over time exceeds the threshold for a plurality of photovoltaic cell modules and the plurality of photovoltaic cell modules are in a predetermined positional relationship, to cause the plurality of photovoltaic cell modules to perform a maximum power point search.

In a power conditioner according to a second aspect, the predetermined positional relationship is preferably that the plurality of photovoltaic cell modules are adjacent to each other.

In a power conditioner according to a third aspect, when the plurality of photovoltaic cell modules for which the change over time exceeds the threshold are in the predetermined positional relationship, the controller preferably determines to cause at least a portion of the plurality of photovoltaic cell modules to perform the maximum power point search.

In a power conditioner according to a fourth aspect, the controller preferably determines to cause a photovoltaic cell module to perform the maximum power point search from among photovoltaic cell modules other than the plurality of photovoltaic cell modules for which the change over time exceeds the threshold, based on a time period at which the change over time exceeds the threshold and on a positional relationship of the plurality of photovoltaic cell modules.

In a power conditioner according to a fifth aspect, the controller preferably suspends maximum power point tracking being performed by a photovoltaic cell module that is to perform the maximum power point search, causes the photovoltaic cell module to perform the maximum power point search, and causes the photovoltaic cell module to resume the maximum power point tracking after completion of the maximum power point search.

A photovoltaic power generation device according to a sixth aspect includes:

a plurality of photovoltaic cell modules; and a power conditioner including a detector configured to detect electrical output of each of the plurality of photovoltaic cell modules and a controller configured to compare a change over time in the electrical output detected by the detector with a threshold, and when the change over time exceeds the threshold for a plurality of photovoltaic cell modules and the plurality of photovoltaic cell modules are in a predetermined positional relationship, to cause the plurality of photovoltaic cell modules to perform a maximum power point search.

In a photovoltaic power generation device according to a seventh aspect, the predetermined positional relationship is preferably that the plurality of photovoltaic cell modules are adjacent to each other.

In a photovoltaic power generation device according to an eighth aspect, when the plurality of photovoltaic cell modules for which the change over time exceeds the threshold are in the predetermined positional relationship, the controller preferably determines to cause at least a portion of the plurality of photovoltaic cell modules to perform the maximum power point search.

In a photovoltaic power generation device according to a ninth aspect, the controller preferably determines to cause a photovoltaic cell module to perform a maximum power point search from among photovoltaic cell modules other than the plurality of photovoltaic cell modules for which the change over time exceeds the threshold, based on a time period at which the change over time exceeds the threshold and on a positional relationship of the plurality of photovoltaic cell modules.

In a photovoltaic power generation device according to a tenth aspect, the controller preferably suspends maximum power point tracking being performed by a photovoltaic cell module that is to perform the maximum power point search, causes the photovoltaic cell module to perform the maximum power point search, and causes the photovoltaic cell module to resume the maximum power point tracking after completion of the maximum power point search.

While the solution to the problem has been described above in terms of devices, an implementation as a method, program, or recording medium storing a program that substantially correspond to the these devices is also possible. This disclosure should be understood as encompassing such implementations.

For example, a control method according to an eleventh aspect includes:

detecting electrical output of each of a plurality of photovoltaic cell modules;

comparing a change over time in the detected electrical output with a threshold; and when the change over time exceeds the threshold for a plurality of photovoltaic cell modules and the plurality of photovoltaic cell modules are in a predetermined positional relationship, causing the plurality of photovoltaic cell modules to perform a maximum power point search.

In a control method according to a twelfth aspect, the predetermined positional relationship is preferably that the plurality of photovoltaic cell modules are adjacent to each other.

A control method according to a thirteenth aspect preferably further includes suspending maximum power point tracking being performed by a photovoltaic cell module that is to perform the maximum power point search, causing the photovoltaic cell module to perform the maximum power point search, and causing the photovoltaic cell module to resume the maximum power point tracking after completion of the maximum power point search.

Advantageous Effect

According to the power conditioner, photovoltaic power generation device, and control method as described above, a maximum power point search can be performed in a way that suppresses a reduction in power generation efficiency.

DETAILED DESCRIPTION

With reference to the figures, the following describes exemplary embodiments.

Figure 1:
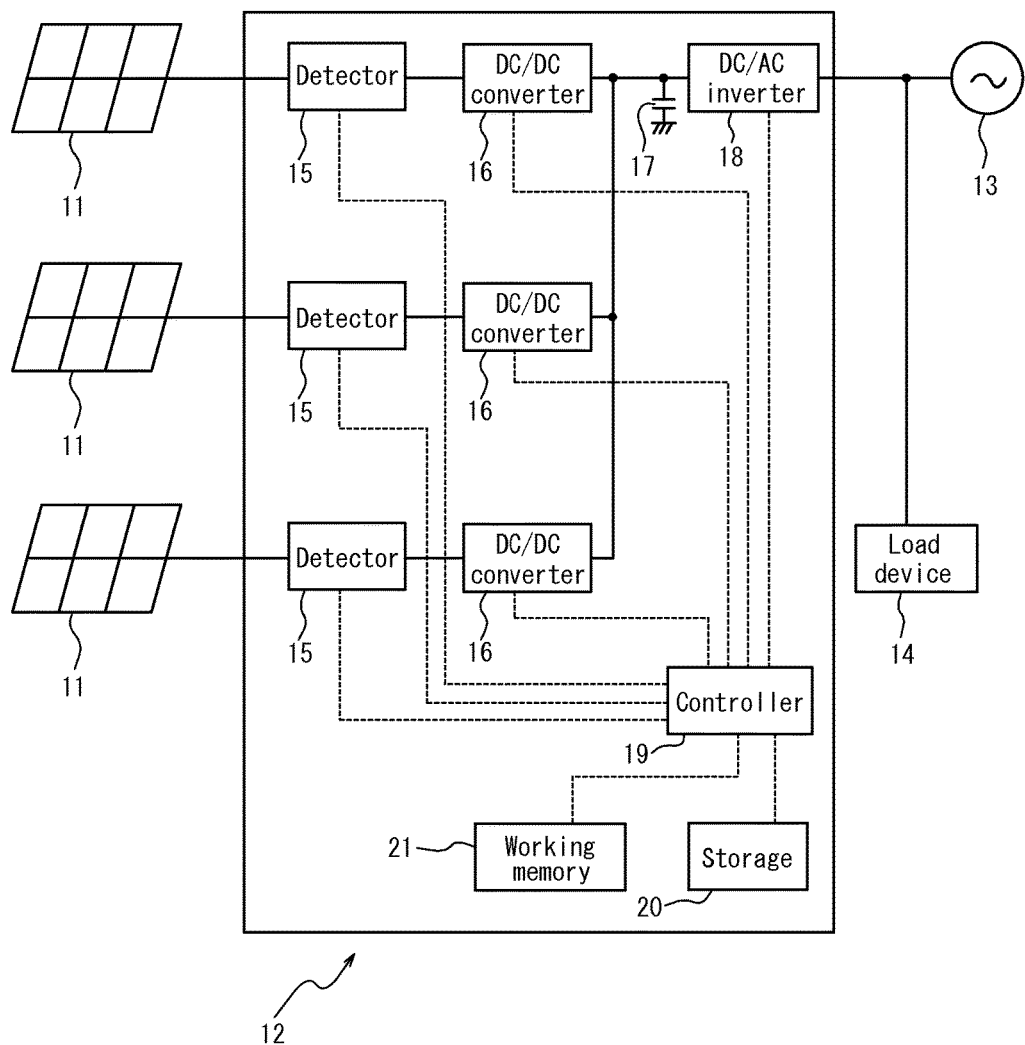
FIG. 1 is a functional block diagram schematically illustrating the structure of a photovoltaic power generation device in which the power conditioner according to one of the embodiments is applied.

First, the following describes a photovoltaic power generation device in which the power conditioner according to one of the embodiments is applied. FIG. 1 is a functional block diagram schematically illustrating the structure of a photovoltaic power generation device in which the power conditioner according to this embodiment is applied. In FIG. 1, the solid lines connecting functional blocks indicate the flow of power. Furthermore, the dashed lines connecting functional blocks in FIG. 1 indicate the flow of control signals or of communicated information.

As illustrated in FIG. 1, the photovoltaic power generation device 10 includes a plurality of photovoltaic cell modules 11, a power conditioner 12, an AC system 13, and a load device 14. The power conditioner 12 converts DC power provided by the photovoltaic cell modules 11 into AC power, provides power to the load device 14, and is connected to the AC system 13, which is a commercial power system. The photovoltaic cell module 11 is a string of a plurality of photovoltaic cell modules connected in series. In this example, three photovoltaic cell modules are strung together.

The power conditioner 12 includes a plurality of detectors 15, a plurality of DC/DC converters 16, an intermediate link capacitor 17, a DC/AC inverter 18, a controller 19, and a storage 20.

The detectors 15 detect electrical output of DC power generated by the string of photovoltaic cell modules 11. The electrical output is, for example, current and voltage. The DC/DC converters 16 convert generated voltage of the photovoltaic cell modules 11 into voltage that can be input into the DC/AC inverter 18.

The DC/AC inverter 18 converts the DC power that is smoothed by the intermediate link capacitor 17 and output from each DC/DC converter 16 into AC power. The DC/AC inverter 18 is connected to the AC system 13 and can provide AC power to the AC load device 14.

As well as a function to control a conventional power conditioner, the controller 19 distinguishes whether to perform a maximum power point search. In order to distinguish whether to perform a maximum power point search, for example every 10 seconds the controller 19 calculates the moving average of the current acquired from the detector 15. The controller 19 compares the difference in consecutive moving averages, i.e. the change over time, with a threshold. The controller 19 stores a photovoltaic cell module 11 for which the change over time is greater than the threshold in a working memory 21. After elapse of a predetermined length of time from the time period of storage, such as 30 minutes or one hour, the controller 19 deletes the photovoltaic cell module 11 stored in the working memory 21. The controller 19 distinguishes whether there is a plurality of photovoltaic cell modules 11 stored in the working memory 21. When a plurality is stored, the controller 19 reads, from the storage 20, the positional relationship of the plurality of photovoltaic cell modules 11 stored in the working memory 21. When the read positional relationship of the photovoltaic cell modules 11 is a predetermined positional relationship, such as being positioned adjacent to one another, the controller 19 successively causes the photovoltaic cell modules 11 for which the change over time is greater than the threshold to perform a maximum power point search.

Furthermore, the controller 19 distinguishes whether to perform a maximum power point search on a photovoltaic cell module 11 other than the plurality of photovoltaic cell modules 11 for which the change over time is greater than the threshold. Based on the time period of storage in the working memory 21, the controller 19 confirms the time period at which the change over time exceeded the threshold for each of the plurality of photovoltaic cell modules 11 for which the change over time is greater than the threshold. Based on the time period at which the change over time exceeded the threshold and on the arrangement of the all of the photovoltaic cell modules 11, the controller 19 determines a photovoltaic cell module 11 for which the change over time is predicted to exceed the threshold in the future and predicts the time period at which the change over time will exceed the threshold. At the predicted time period, the controller 19 causes the determined photovoltaic cell module 11 to perform a maximum power point search.

At a time other than the time for performing a maximum power point search, the controller 19 causes all of the photovoltaic cell modules 11 to perform maximum power point tracking by the hill climbing method.

The storage 20 stores the positional relationship of each photovoltaic cell module 11 at the time of installation of the photovoltaic power generation device 10. The storage 20 can, for example, store the positional relationship in the format illustrated in Table 1, and the positional relationship can be set by the installer of the photovoltaic power generation device 10. Taking the photovoltaic cell module 11 in the leftmost column to be in the center, the number of the photovoltaic cell module 11 that is installed above/below/left/right is written in the above/below/left/right columns in Table 1.

TABLE 1

| Photovoltaic cell module | Direction (bearing) | Above (south) | Below (north) | Left (east) | Right (west) |
|---|---|---|---|---|---|
| 1 | south | — | — | — | 2 |
| 2 | south | — | — | 1 | 3 |
| 3 | south | — | — | 2 | — |

Figure 2:
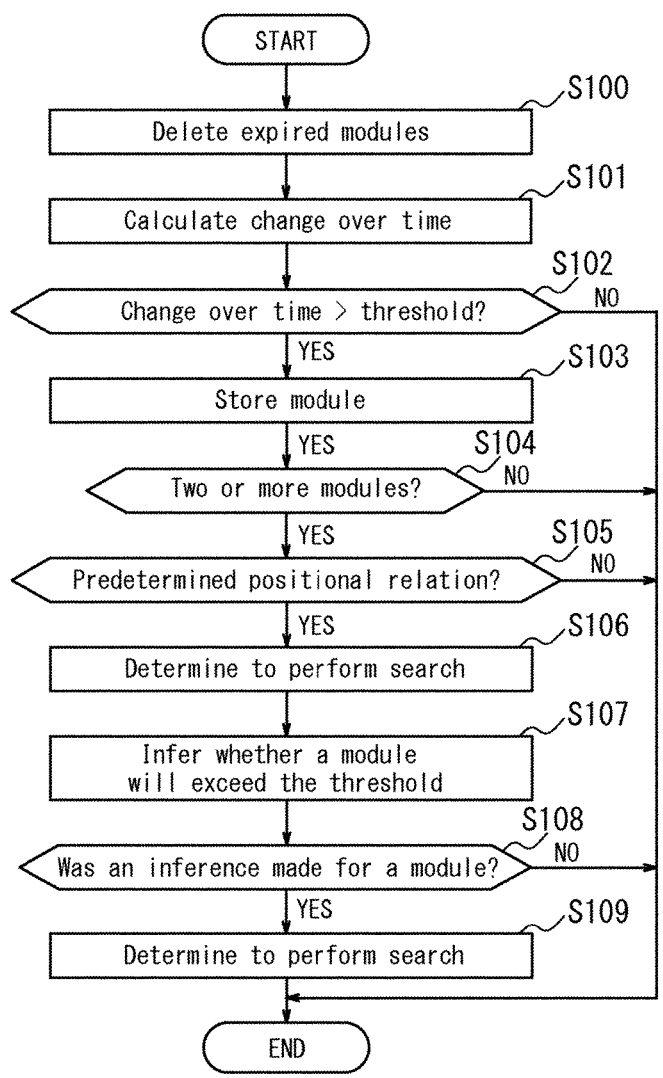
FIG. 2 is a flowchart illustrating a process, executed by the controller, to distinguish whether to perform a maximum power point search.

Next, the process, executed by the controller 19, to distinguish whether to perform a maximum power point search is described with reference to the flowchart in FIG. 2. The controller 19 starts this distinguishing process periodically, for example every 10 seconds.

In step S100, the controller 19 deletes, from the working memory 21, any photovoltaic cell module 11 for which a predetermined length of time has elapsed from the time period of storage in the working memory 21. After deletion, processing proceeds to step S101.

In step S101, the controller 19 calculates the change over time from the moving average at the previous period to the moving average at the present period for the current acquired from the detector 15. Upon calculation of the change over time, processing proceeds to step S102.

In step S102, the controller 19 distinguishes whether the change over time calculated in step S101 is greater than a threshold. When the change over time for all photovoltaic cell modules 11 is equal to or less than the threshold, the controller 19 terminates the process to distinguish whether to perform a maximum power point search. When the change over time for any of the photovoltaic cell modules 11 is greater than the threshold, it is inferred that a shadow or the like has been cast on the photovoltaic cell module 11, and processing proceeds to step S103. The current generated by the photovoltaic cell module 11 ideally changes in accordance with natural changes in the amount of sunlight, but when a shadow is cast on even a portion of the photovoltaic cell module 11, the current changes by an amount that exceeds the current change corresponding to a natural change in the amount of sunlight. Therefore, when the amount of change is greater than the threshold, a shadow may be cast on at least a portion of the photovoltaic cell modules 11.

In step S103, the controller 19 stores the photovoltaic cell module 11 for which the change over time was distinguished in step S102 as being greater than the threshold in the working memory 21. After storage in the working memory 21, processing proceeds to step S104.

In step S104, based on the number of photovoltaic cell modules 11 stored in the working memory 21, the controller 19 distinguishes whether there are two or more photovoltaic cell modules 11 for which the change over time is greater than the threshold. When there is one photovoltaic cell module 11 or less, the controller 19 terminates the process to distinguish whether to perform a maximum power point search. When there are two or more photovoltaic cell modules 11, processing proceeds to step S105.

In step S105, the controller 19 distinguishes whether the positional relationship between the two or more photovoltaic cell modules 11 for which the change over time is greater than the threshold is a predetermined positional relationship, such as being adjacent to each other. When the photovoltaic cell modules 11 are not in a predetermined positional relationship, the controller 19 terminates the process to distinguish whether to perform a maximum power point search. When the photovoltaic cell modules 11 are in a predetermined positional relationship, processing proceeds to step S106. For a plurality of photovoltaic cell modules 11 that are in a predetermined positional relationship, such as being adjacent to each other, the photovoltaic cell modules 11 are often covered by a partial shadow, due to a passing cloud or a building, when the change over time in the current is large. Therefore, by confirming the positional relationship, it can be inferred that a partial shadow is being cast on the photovoltaic cell modules 11.

In step S106, the controller 19 determines to cause the photovoltaic cell modules 11 for which the change over time is greater than the threshold to perform a maximum power point search. The controller 19 determines to perform the maximum power point searches in order by time period of storage in the working memory 21, starting with the earliest time period of storage. After determining the order of performance, processing proceeds to step S107.

In step S107, based on the time period at which the change over time exceeded the threshold and on the arrangement of the photovoltaic cell modules 11, the controller 19 infers whether the change over time is expected to exceed the threshold in the future for any of the photovoltaic cell modules 11 for which the change over time is currently equal to or less than the threshold. Upon inferring whether such a photovoltaic cell module 11 exists, processing proceeds to step S108.

Figure 3:
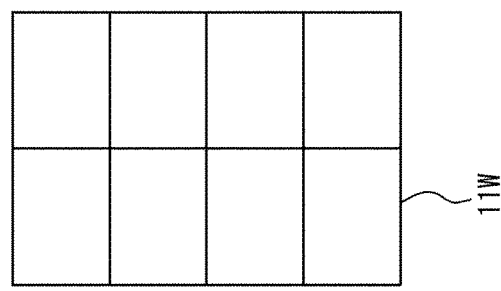
FIG. 3 illustrates an exemplary arrangement of a plurality of photovoltaic cell modules.
Figure 3:
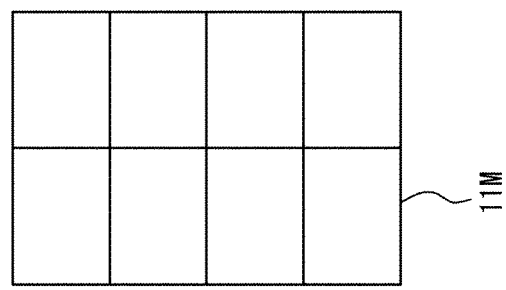
Figure 3:
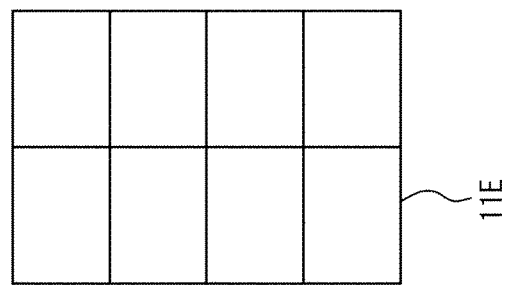

In step S108, the controller 19 distinguishes whether it was inferred in step S107 that the change over time will exceed the threshold in the future for a photovoltaic cell module 11. When there is no such photovoltaic cell module 11, the controller 19 terminates the process to distinguish whether to perform a maximum power point search. When there is such a photovoltaic cell module 11, processing proceeds to step S109. For example, when a cloud passes from the southeast to the northwest over the photovoltaic cell modules 11 in the positional relationships illustrated in FIG. 3, the change over time in the current of the photovoltaic cell module 11E furthest to the east exceeds the threshold first, and the change over time in the current of the photovoltaic cell module 11M in the middle exceeds the threshold next. Under these conditions, it is inferred that in the future, the change over time in the current of the photovoltaic cell module 11W furthest to the west will exceed the threshold.

In step S109, the controller 19 determines to cause the photovoltaic cell module 11 for which it was inferred in step S107 that the change over time will exceed the threshold to perform a maximum power point search. Based on the time period at which the change over time exceeds the threshold and the arrangement of the photovoltaic cell modules 11, the controller 19 determines when to perform the maximum power point search. After determining when to perform the maximum power point search, the controller 19 terminates the process to distinguish whether to perform a maximum power point search.

Figure 4:
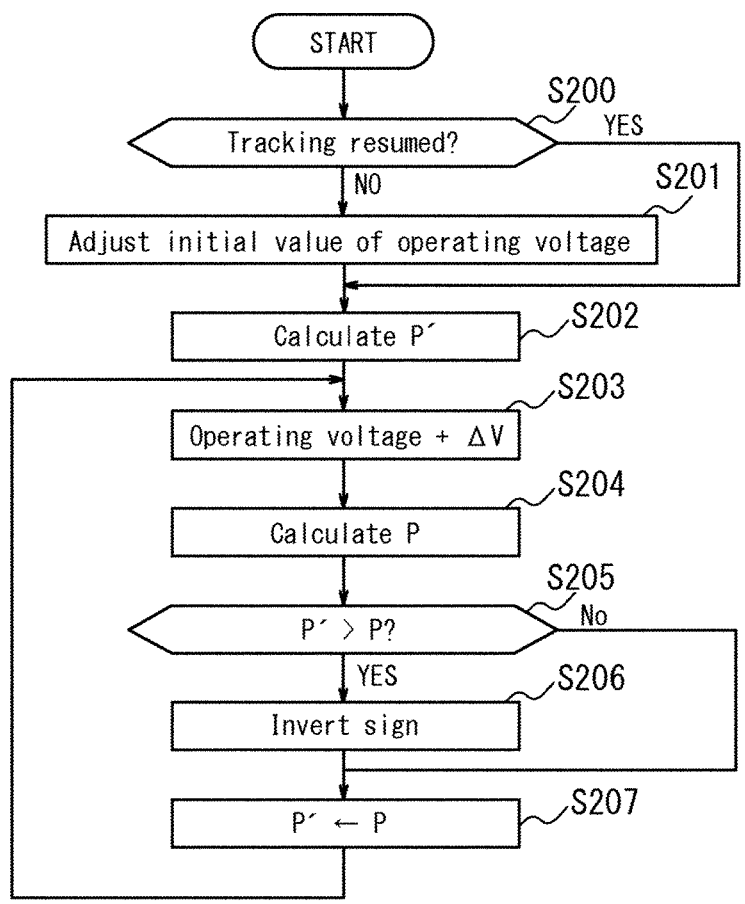
FIG. 4 is a flowchart illustrating a maximum power point tracking process executed by the controller.

Next, the maximum power point tracking process executed by the controller 19 is described with reference to the flowchart in FIG. 4. The controller 19 executes the maximum power point tracking process for each photovoltaic cell module 11 separately from the start of power generation by the photovoltaic cell modules 11 until suspension of power generation.

In step S200, the controller 19 distinguishes whether the photovoltaic cell module 11 subject to control is a photovoltaic cell module 11 for which maximum power point tracking was resumed after a maximum power point search. When maximum power point tracking was resumed for the photovoltaic cell module 11, processing proceeds to step S201. When resumption is complete for the photovoltaic cell module 11, processing skips step S201 and proceeds to step S202.

In step S201, the controller 19 resets the operating voltage of the DC/DC converter 16 corresponding to the photovoltaic cell module 11 that is subject to control to the initial value. The initial value may be set to any value, such as the open-circuit voltage. Upon resetting the operating voltage to the initial value, processing proceeds to step S202.

In step S202, the controller 19 acquires the current and voltage from the detector 15 and calculates the power P' which serves as a reference for comparison. Upon calculation of the reference power P', processing proceeds to step S203.

In step S203, the controller 19 adjusts the operating voltage of the DC/DC converter 16 so as to match the result of adding ΔV to the present operating voltage. After adjustment of the operating voltage, processing proceeds to step S204. The sign of ΔV is determined so that by the addition of ΔV, the voltage moves in the short-circuit direction, i.e. in a decreasing direction.

In step S204, the controller 19 acquires the current and voltage from the detector 15 and calculates the present power P. Upon calculation of the present power P, processing proceeds to step S205.

In step S205, the controller 19 compares the reference power P' with the present power P to distinguish whether the present power P is less than the reference power P'. When the present power P is less than the reference power P', processing proceeds to step S206. When the present power P is equal to or greater than the reference power P', processing skips step S206 and proceeds to step S207.

In step S206, the controller 19 inverts the sign of the voltage ΔV added to the present operating voltage in step S203. After sign inversion, processing proceeds to step S207.

In step S207, the controller 19 changes the reference power P' to the value of the present power P. After the reference power P' is changed, processing returns to step S203.

Figure 5:
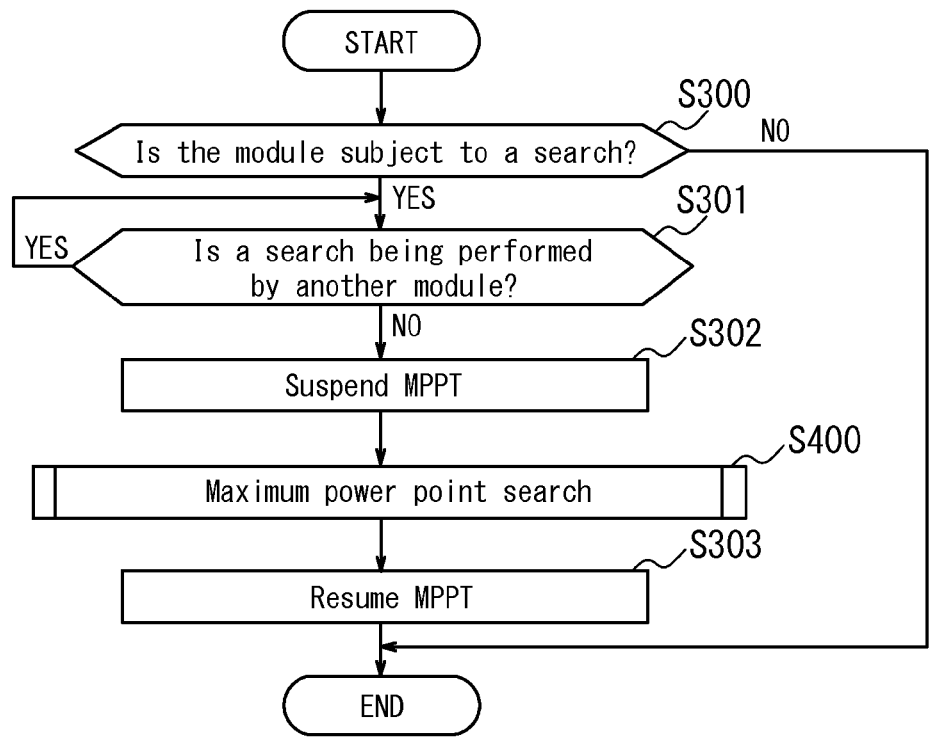
FIG. 5 is a flowchart illustrating an interrupt process executed by the controller.

Next, the interrupt process executed by the controller 19 is described with reference to the flowchart in FIG. 5. After terminating the process to distinguish whether to perform a maximum power point search, the controller 19 executes the interrupt process for each photovoltaic cell module 11 separately.

In step S300, the controller 19 distinguishes whether the photovoltaic cell module 11 subject to control is a photovoltaic cell module 11 for which the performance of a maximum power point search was determined during the process to distinguish whether to perform a maximum power point search. When the photovoltaic cell module 11 is not subject to a maximum power point search, the controller 19 terminates the interrupt process. When the photovoltaic cell module 11 is subject to a maximum power point search, processing proceeds to step S301.

In step S301, the controller 19 distinguishes whether a maximum power point search is being performed by another photovoltaic cell module 11. When a maximum power point search is being performed by another photovoltaic cell module 11, step S301 is repeated until that maximum power point search is complete. Upon completion of the maximum power point search by the other photovoltaic cell module 11, processing proceeds to step S302.

In step S302, the controller 19 suspends the maximum power point tracking (MPPT) process (see FIG. 4) on the photovoltaic cell module 11 that is subject to control. Upon suspension of the maximum power point tracking process, processing proceeds to step S400.

In step S400, as described below, the controller 19 executes a maximum power point search process. Upon completion of the maximum power point search process, processing proceeds to step S303.

In step S303, the controller 19 resumes the maximum power point tracking (MPPT) process. After the maximum power point tracking process is resumed, the interrupt process is terminated.

Figure 6:
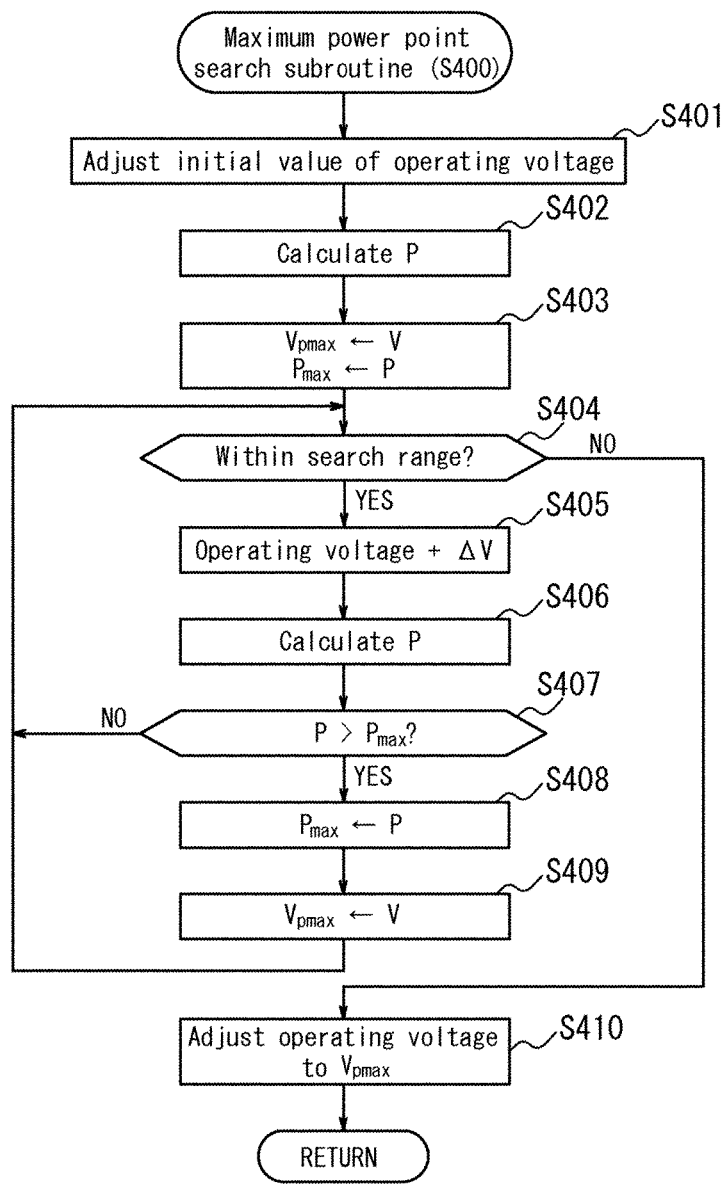
FIG. 6 is a flowchart illustrating a subroutine, executed by the controller, for the maximum power point search process.
Figure 7A:
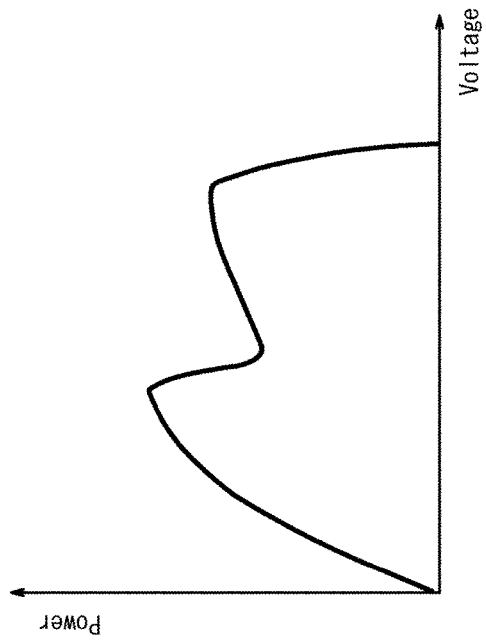
FIG. 7 is a graph illustrating the relationship between the operating voltage in the photovoltaic cell module and the generated power.
Figure 7B:
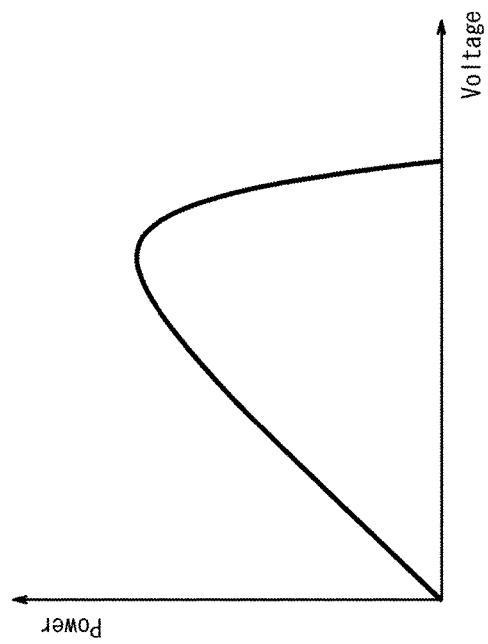

Next, the subroutine (S400), executed by the controller 19, for the maximum power point search process is described with reference to the flowchart in FIG. 6.

Upon the start of the subroutine for the maximum power point search process, in step S401, the controller 19 resets the operating voltage of the DC/DC converter 16 corresponding to the photovoltaic cell module 11 that is subject to control to the initial value. The initial value may be set to any value, such as the open-circuit voltage or the present operating voltage. Upon resetting the operating voltage to the initial value, processing proceeds to step S402.

In step S402, the controller 19 acquires the current and voltage from the detector 15 and calculates the present power P. Upon calculation of the present power P, processing proceeds to step S403.

In step S403, the controller 19 changes the operating voltage $V_{pmax}$ that yields the maximum power to the value of the present operating voltage. The controller 19 also changes the maximum power $P_{max}$ to the value of the present power P. After the maximum power and the operating voltage that yields the maximum power are changed, processing proceeds to step S404.

In step S404, the controller 19 distinguishes whether the present operating voltage is within the search range. When the operating voltage is outside of the search range, processing proceeds to step S410. When the operating voltage is within the search range, processing proceeds to step S405. When the initial value of the operating voltage is the open-circuit voltage, then the search range may, for example, be from the open-circuit voltage to a value that is 80% of the short-circuit voltage. When the initial value of the operating voltage is the present operating voltage, the search range may be 50% of the range from the present operating voltage to the short-circuit voltage.

In step S405, the controller 19 adjusts the operating voltage of the DC/DC converter 16 so as to match the result of adding $\Delta V$ to the present operating voltage. After adjustment of the operating voltage, processing proceeds to step S406. The sign of $\Delta V$ is determined so that by the addition of $\Delta V$, the voltage moves in the short-circuit direction, i.e. in a decreasing direction.

In step S406, the controller 19 acquires the current and voltage from the detector 15 and calculates the present power P. Upon calculation of the present power P, processing proceeds to step S407.

In step S407, the controller 19 compares the maximum power $P_{max}$ with the present power P and distinguishes whether the present power P is larger than the maximum power $P_{max}$. When the present power P is equal to or less than the maximum power $P_{max}$, processing returns to step S404. When the present power P is larger than the maximum power $P_{max}$, processing proceeds to step S408.

In step S408, the controller 19 changes the maximum power $P_{max}$ to the value of the present power P. After the maximum power $P_{max}$ is changed, processing proceeds to step S409.

In step S409, the controller 19 changes the operating voltage $V_{pmax}$ that yields the maximum power to the value V of the present operating voltage. After the operating voltage $V_{pmax}$ that yields the maximum power is changed, processing returns to step S404.

In step S410, to which processing proceeds when the operating voltage is within the search range in step S404, the controller 19 adjusts the operating voltage to match the value of the operating voltage $V_{pmax}$ that yields the maximum power. After adjustment of the operating voltage, the subroutine for the maximum power point search process is complete, and processing returns to step S303 (see FIG. 5).

According to the power conditioner of this embodiment with the above-described structure, a maximum power point search is performed when there is a plurality of photovoltaic cell modules 11 for which the change over time in the electrical output of the detector 15 exceeds a threshold and the photovoltaic cell modules 11 are in a predetermined positional relationship. When there is a plurality of photovoltaic cell modules 11 for which the change over time is greater than the threshold, it is thought that a partial shadow has been cast on some of the photovoltaic cell modules 11. Therefore, by distinguishing which photovoltaic cell modules 11 satisfy the above conditions, a maximum power point search can be performed in a way that suppresses a reduction in power generation efficiency.

Furthermore, according to the power conditioner of this embodiment, when the plurality of photovoltaic cell modules 11 for which the change over time in the electrical output of the detector 15 is greater than a threshold are in a predetermined positional relationship, a maximum power point search is performed on the photovoltaic cell modules 11 for which the change over time is greater than the threshold. In particular, the probability of a partial shadow being cast on the photovoltaic cell modules 11 for which the change over time is greater than the threshold is thought to be high. Therefore, performing the maximum power point search on the photovoltaic cell modules 11 that satisfy the above conditions allows for further improvement in the power generation efficiency.

Furthermore, according to the power conditioner of this embodiment, whether to perform a maximum power point search is distinguished even for a photovoltaic cell module 11 for which the change over time in the electrical output of the detector 15 is equal to or less than the threshold, based on the positional relationship of a plurality of photovoltaic cell modules 11 for which the change over time exceeds the threshold. As described above, a partial shadow typically occurs due to a cloud or a building, and the occurrence of a partial shadow is coupled with cloud flow or with the positional relationship between the building and the sun. Hence, even for a photovoltaic cell module 11 for which the change over time is equal to or less than the threshold, the occurrence of a partial shadow can be predicted in advance, and a maximum power point search can be performed.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure.

For example, in the above embodiment, the controller 19 distinguishes whether to perform a maximum power point search based on the current acquired from the detector 15, yet this determination may be made based on a different electrical output acquired from the detector 15, such as voltage.

In the above embodiment, as illustrated in Table 1, the storage 20 can store the positional relationships of the photovoltaic cell modules 11 in four directions, i.e. above/below/left/right. The four directions of upper-right, upper-left, lower-right, and lower-left may be added, however, for storage of a total of eight positional relationships. The directions of the positional relationships used in distinguishing whether to perform a maximum power point search are determined in accordance with the directions that can be set. While the predetermined positional relationship for distinguishing whether to perform a maximum power point search is that of being adjacent to one another in the above embodiment, the predetermined positional relationship is not limited to an adjacent positional relationship. The predetermined positional relationship may be a different positional relationship, such as three photovoltaic cell modules 11 being continuous along one direction.

REFERENCE SIGNS LIST

10 Photovoltaic power generation device
11 Photovoltaic cell module
12 Power conditioner
13 AC system
14 Load device
15 Detector
16 DC/DC converter
17 Intermediate link capacitor
18 DC/AC inverter
19 Controller
20 Storage
21 Working memory

The invention claimed is:

1. A power conditioner comprising:
a detector configured to detect electrical output of each of a plurality of photovoltaic cell modules; and
a controller configured to compare a change over time in the electrical output detected by the detector with a threshold, and when the change over time exceeds the threshold for a plurality of photovoltaic cell modules and the plurality of photovoltaic cell modules are in a predetermined positional relationship, to cause the plurality of photovoltaic cell modules to perform a maximum power point search.

2. The power conditioner of claim 1, wherein the predetermined positional relationship is that the plurality of photovoltaic cell modules are adjacent to each other.

3. The power conditioner of claim 1, wherein when the plurality of photovoltaic cell modules for which the change over time exceeds the threshold are in the predetermined positional relationship, the controller determines to cause at least a portion of the plurality of photovoltaic cell modules to perform the maximum power point search.

4. The power conditioner of claim 3, wherein the controller determines to cause a photovoltaic cell module to perform the maximum power point search from among photovoltaic cell modules other than the plurality of photovoltaic cell modules for which the change over time exceeds the threshold, based on a time period at which the change over time exceeds the threshold and on a positional relationship of the plurality of photovoltaic cell modules.

5. The power conditioner of claim 1, wherein the controller suspends maximum power point tracking being performed by a photovoltaic cell module that is to perform the maximum power point search, causes the photovoltaic cell module to perform the maximum power point search, and causes the photovoltaic cell module to resume the maximum power point tracking after completion of the maximum power point search.

6. A photovoltaic power generation device comprising:
a plurality of photovoltaic cell modules; and
a power conditioner comprising a detector configured to detect electrical output of each of the plurality of photovoltaic cell modules and a controller configured to compare a change over time in the electrical output detected by the detector with a threshold, and when the change over time exceeds the threshold for a plurality of photovoltaic cell modules and the plurality of photovoltaic cell modules are in a predetermined positional relationship, to cause the plurality of photovoltaic cell modules to perform a maximum power point search.

7. The photovoltaic power generation device of claim 6, wherein the predetermined positional relationship is that the plurality of photovoltaic cell modules are adjacent to each other.

8. The photovoltaic power generation device of claim 6, wherein when the plurality of photovoltaic cell modules for which the change over time exceeds the threshold are in the predetermined positional relationship, the controller determines to cause at least a portion of the plurality of photovoltaic cell modules to perform the maximum power point search.

9. The photovoltaic power generation device of claim 8, wherein the controller determines to cause a photovoltaic cell module to perform a maximum power point search from among photovoltaic cell modules other than the plurality of photovoltaic cell modules for which the change over time exceeds the threshold, based on a time period at which the change over time exceeds the threshold and on a positional relationship of the plurality of photovoltaic cell modules.

10. The photovoltaic power generation device of claim 6, wherein the controller suspends maximum power point tracking being performed by a photovoltaic cell module that is to perform the maximum power point search, causes the photovoltaic cell module to perform the maximum power point search, and causes the photovoltaic cell module to resume the maximum power point tracking after completion of the maximum power point search.

11. A method of controlling a power conditioner, the method comprising:
detecting electrical output of each of a plurality of photovoltaic cell modules;
comparing a change over time in the detected electrical output with a threshold; and
when the change over time exceeds the threshold for a plurality of photovoltaic cell modules and the plurality of photovoltaic cell modules are in a predetermined positional relationship, causing the plurality of photovoltaic cell modules to perform a maximum power point search.

12. The method of claim 11, wherein the predetermined positional relationship is that the plurality of photovoltaic cell modules are adjacent to each other.

13. The method of claim 11, further comprising suspending maximum power point tracking being performed by a photovoltaic cell module that is to perform the maximum power point search, causing the photovoltaic cell module to perform the maximum power point search, and causing the photovoltaic cell module to resume the maximum power point tracking after completion of the maximum power point search.

* * * * *